(12) United States Patent
Sasaki et al.

(10) Patent No.: US 11,472,955 B2
(45) Date of Patent: Oct. 18, 2022

(54) RESIN COMPOSITION AND BIOLOGICAL MODEL

(71) Applicant: Denka Company Limited, Tokyo (JP)

(72) Inventors: Takashi Sasaki, Tokyo (JP); Akira Miyama, Tokyo (JP); Toru Arai, Tokyo (JP)

(73) Assignee: Denka Company Limited, Tokyo (JP)

( * ) Notice: Subject to any disclaimer, the term of this patent is extended or adjusted under 35 U.S.C. 154(b) by 663 days.

(21) Appl. No.: 16/486,928

(22) PCT Filed: Feb. 20, 2018

(86) PCT No.: PCT/JP2018/006041
§ 371 (c)(1),
(2) Date: Aug. 19, 2019

(87) PCT Pub. No.: WO2018/151320
PCT Pub. Date: Aug. 23, 2018

(65) Prior Publication Data
US 2020/0157339 A1    May 21, 2020

(30) Foreign Application Priority Data
Feb. 20, 2017   (JP) .............................. JP2017-028850

(51) Int. Cl.
*C08L 53/00*    (2006.01)
*G09B 23/30*    (2006.01)

(52) U.S. Cl.
CPC ............ *C08L 53/005* (2013.01); *G09B 23/30* (2013.01); *C08L 2203/02* (2013.01); *C08L 2205/03* (2013.01); *C08L 2205/16* (2013.01)

(58) Field of Classification Search
CPC ........ C08L 23/00; C08L 23/02; C08L 23/025; C08L 23/04; C08L 23/06; C08L 23/08; C08L 23/0807; C08L 23/0815; C08L 23/0823; C08L 23/083; C08L 23/0838; C08L 23/0846; C08L 23/0853; C08L 23/0861; C08L 23/0869; C08L 23/0876; C08L 23/0884; C08L 23/0892; C08L 23/10; C08L 23/12; C08L 23/14; C08L 23/142; C08L 23/145; C08L 23/147; C08L 23/16; C08L 23/18; C08L 23/20; C08L 23/22; C08L 23/24; C08L 53/025; C08L 53/005
See application file for complete search history.

(56) References Cited

U.S. PATENT DOCUMENTS

| 10,041,191 B1 * | 8/2018 | Tarutani .................... B29B 9/00 |
| 2005/0184619 A1 | 8/2005 | Chen |
| 2011/0245405 A1 | 10/2011 | Jogo et al. |
| 2012/0028231 A1 | 2/2012 | Misawa et al. |
| 2017/0044371 A1 | 2/2017 | Ono |
| 2018/0244912 A1 | 8/2018 | Miyama et al. |

FOREIGN PATENT DOCUMENTS

| JP | 61-253066 A | 11/1986 |
| JP | 09-208836 A | 8/1997 |
| JP | 2003-268193 A | 9/2003 |
| JP | 2007-316434 A | 12/2007 |
| JP | 2008-241988 A | 10/2008 |
| JP | 2010-178809 A | 8/2010 |
| WO | WO 2010/024382 A1 | 3/2010 |
| WO | WO 2010/095519 A1 | 8/2010 |
| WO | WO 2015/162976 A1 | 10/2015 |
| WO | WO 2017/030145 A1 | 2/2017 |
| WO | WO 2017/155026 A1 | 9/2017 |

OTHER PUBLICATIONS

Anonymous: SEPTON™ and HYBRAR™, Thermoplastic Elastomers, Technical Information, Jun. 1, 2019, 1-12, XP0055633523, retrieved from https://www.elastomer.kuraray.com/fileadmin/user_upload/ELASTOMERE/DOWNLOADS/product_brochures/Septon_and_Hybrar_Technical_Information.pdf on Oct. 17, 2019.
Anonymous: Kemibesto FDSS-5, FDSS-2 and FD380 (Fluffed polyethylene synthetic pulp), Jan. 1, 2014, retrieved from http://www.mkf/co/jo/english/product/menu002/pdf/chemist_en.pdf on Oct. 18, 2019.

* cited by examiner

*Primary Examiner* — Jeffrey C Mullis
(74) *Attorney, Agent, or Firm* — Foley & Lardner LLP

(57) ABSTRACT

[Problem] To provide a softer resin material that can be highly filled with an oil and that has almost no seepage (bleed-out) of oil. Additionally, to provide a biological model that is easy to handle and that has a softness and mechanical properties closer to those of organs and a texture close to that of organs. [Solution] A resin composition containing 100 parts by mass of component (A), a hydrogenated block copolymer having an MFR (measured at a temperature of 230° C. and with a load of 2.16 kg) of 1 g/10 min or less; more than 1000 parts by mass and at most 2000 parts by mass of component (B), an oil; and at least 10 parts by mass and at most 120 parts by mass of component (C), a polyolefin resin having a specific surface area of 0.01 to 30 $m^2/g$.

7 Claims, No Drawings

RESIN COMPOSITION AND BIOLOGICAL MODEL

CROSS-REFERENCE TO RELATED APPLICATIONS

This application is the U.S. National Stage of PCT/JP2018/006041, filed Feb. 20, 2018, which claims priority to JP 2017-028850, filed Feb. 20, 2017.

TECHNICAL FIELD

A first aspect of the present invention relates to a resin composition in which a hydrogenated block copolymer is highly filled with an oil. A second aspect of the present invention relates to a resin composition that is used in biological models, i.e., biological models such as organ models, blood vessel models and skin models, and that has softness and various properties similar to those of organs, blood vessels, skin and the like; and to a biological model using this resin composition. For example, the present invention relates to a thermoplastic resin composition and a biological model using the same, capable of being utilized in fields for training physicians, technicians and the like, in order to improve surgical techniques such as those for incisions and the suturing of incisions on the human body and the like. In the present description, a biological model is a concept that includes organ models, blood vessel models and skin models.

BACKGROUND ART

Whereas hydrogenated block copolymers are widely used as materials for thermoplastic elastomers, they are used as resin compositions to which oils have been added in order to lower the raw material costs and thus make them more economical, or to form softer elastomers (Patent Document 1). However, they have the problem that, if too much oil is added, the oil can seep out (bleed out).

Among the operations that are performed by surgeons, surgical operations on organs such as the heart, using surgical cutting tools such as surgical scalpels, involve work requiring careful and skilled surgical techniques, and since a cut that is too deep when making an incision by means of a surgical operation can be a fatal wound, it is no exaggeration to say that technical prowess in such surgical techniques has direct consequences on the success or failure of surgical operations. Conventionally, it is not possible to use live bodies to practice surgery on human internal organs, so the internal organs of animals such as pigs are generally used. However, the internal organs of the animals need to be fresh. Additionally, if a person practicing surgical techniques is wounded, there is a risk of infection, through the wound, by pathogens and the like contained in the animal internal organs, and there are tremendous costs in managing the hygiene of the surgical cutting tools and in disposing the used internal organs. Although the possibility of using konjac as a substitute for biological internal organs for practicing surgical technique has been explored, the cutting sensation and texture of konjac are very different from the cutting sensation and texture of the human body, so it cannot be considered to be suitable for practicing surgical technique. Thus, the possibility of using biological models such as organ models that are made to simulate biological organs as a substitute for biological internal organs has been considered (Patent Documents 2 to 5).

PRIOR ART DOCUMENTS

Patent Documents

Patent Document 1: JP 2003-268193 A
Patent Document 2: JP 2008-241988 A
Patent Document 3: JP 2007-316434 A
Patent Document 4: JP 2010-178809 A
Patent Document 5: WO 2010/095519 A1

SUMMARY OF INVENTION

Technical Problem

As organ models, for example, models comprising soft resin materials such as, for example, silicone, urethane elastomers and styrene elastomers, or so-called dry materials, have been proposed (see Patent Document 2). However, the cutting sensation and texture of these materials obtained by means of the conventional art differ considerably from the cutting sensation and texture of the human body, so these materials cannot be considered to be suitable for practicing surgical techniques. These materials have the problem that, if the softness is made closer to that of biological organs, the mechanical strength thereof markedly decreases, and the durability thereof decreases so that, for example, they can easily tear at sectioned surfaces cut with a scalpel.

Additionally, conventional styrenic elastomers have the problem that, if the oil content is increased in order to make the softness closer to that of organs, the oil bleeds out during storage. Silicone and urethane elastomers are post-cured and thus have the problem that they take time to cure and have low productivity. Furthermore, when organ models are prepared by injection into molds comprising an inner mold and an outer mold, a cut must be made when extracting the inner mold. However, when rejoining the cut, there is a problem in that post-cured resins are difficult to rejoin. Although such resins can be joined by using specific adhesives, the adhesives are hard in comparison to the organ model material, so there is a problem in that the texture becomes different after being joined. These soft resins differ largely from actual organs in that, even if the softness is made dose to that of organs, the tensile elongation is too high. Although actual organs are made of soft tissue, they are characterized by having low tensile elongation, and this feature has not been able to be reproduced with conventional soft resins.

As a substitute for the human body, the use of a biological soft tissue model has been proposed, said model being obtained by injecting a solution, in which a single type or two types of polyvinyl alcohols have been dissolved, into a biological soft tissue cast, then cooling the solution to form a gel and extracting the resulting aqueous gel composition from the cast (see, for example, Patent Document 3). These are known as so-called wet materials that include a significant amount of water.

However, these biological soft tissue models often require two types of polyvinyl alcohol as raw materials in the production stages thereof, so the preparation of the compositions thereof can be complicated. Additionally, they require dimethyl sulfoxide, which is highly toxic, as a solvent, and thus have the problem of requiring complicated operations such as ethanol substitution and water substitution in order to remove the dimethyl sulfoxide. Since it is necessary to maintain a certain water content in polyvinyl alcohol-based materials, there is a need for humidity management and water content management during storage, and measures such as, for example, refrigerated storage must be taken to prevent decomposition and the growth of mold or the like, making long-term storage difficult and in many cases, resulting in a usage period of a few weeks.

Therefore, in recent years, there has been a desire for the development of a material for use in biological models that has softness, elongation, texture and the like approximating those of human internal organs, that has excellent mechanical strength and durability, that can be suitably used for practicing surgical techniques for human internal organs, and that uses a so-called dry material not containing water.

Meanwhile, a lesion model that is provided in a lumen in a tube having said lumen (Patent Document 4), and a biological model for use in training, characterized by comprising a simulated lesion member that has a constrictive or occlusive form midway on a tubular body having a lumen, and that simulates a lesion formed in the tubular tissue, wherein the simulated lesion member is at least partially formed from a plastically deformable material, and wherein the biological model is used for dilation training to perform a dilation operation (Patent Document 5), have been proposed. However, regarding the materials that are used, only general descriptions are provided, and there are no descriptions regarding the properties thereof, such as, for example, the MFR or bleed-out properties.

Furthermore, in the field to which the present invention belongs, materials for use in skin models and blood vessel models for medical simulators have been sought. Such models are favorably used, for example, for practical training in the operation of catheters, blood transfusion operations, injections and infusions by medical students and nurses. For this reason, it is preferable for the texture and the sensation of incisions with a scalpel, particularly in the case of skin, and the texture and the sensation of puncturing with a needle, in the case of blood vessels, to be dose to those of actual human skin and blood vessels.

The present invention was made in view of the aforementioned conventional art, and relates to a blended formulation for highly filling a composition with an oil, more than in the conventional art. In other words, the present invention addresses the problem of providing a softer resin composition that can be highly filled with an oil and that can suppress bleed-out.

Furthermore, in an application as a medical model, the present invention addresses the problem of providing, for example, a resin composition that has elasticity (softness) similar to that of human internal organs and the like, that has little elongation, and that has a texture and a cutting sensation approximating those of human internal organs or the like; and of providing a biological model using this resin composition.

Solution to Problem

The means for solving the above-mentioned problems are indicated below.

[1] A resin composition containing 100 parts by mass of component (A), a hydrogenated block copolymer having an MFR (temperature 230° C., load 2.16 kg) of 1 g/10 min or less; more than 1000 parts by mass and at most 2000 parts by mass of component (B), an oil; and at least 10 parts by mass and at most 120 parts by mass of component (C), a polyolefin resin having a specific surface area of 0.01 to 30 $m^2/g$.

[2] The resin composition according to [1], further comprising 1 to 400 parts by mass of component (D), an inorganic filler, relative to 100 parts by mass of component (A), the hydrogenated block copolymer.

[3] The resin composition according to [2], wherein component (D), the inorganic filler, is calcium carbonate.

[4] The resin composition according to any one of [1] to [3], further comprising 10 to 80 parts by mass of component (E), an immiscible fibrous filler, relative to 100 parts by mass of component (A), the hydrogenated block copolymer.

[5] The resin composition according to [4], wherein component (E), the immiscible fibrous filler, is a polyvinyl alcohol fiber filler.

[6] A biological model using the resin composition according to any one of [2] to [5].

[7] The biological model according to [6], wherein the biological model is an organ model, a skin model or a blood vessel model.

Advantageous Effects of Invention

According to the present invention, it is possible to provide a softer resin composition that can be highly filled with oil and that can suppress bleed-out. Additionally, it is possible to provide a resin composition for use in biological models, having elasticity (softness) similar to that of human internal organs, blood vessels, skin or the like, having little elongation, and having a texture and a cutting sensation approximating that of human internal organs or the like; and a biological model using this resin composition.

DESCRIPTION OF EMBODIMENTS

Herebelow, an embodiment of the present invention will be explained in detail. The present invention is not limited to the embodiment below, and can be implemented by incorporating appropriate modifications within a range not impeding the effects of the present invention.

[Resin Composition]

The resin composition according to the present embodiment first relates to a blended formulation for more highly filling an oil than in the conventional art. In other words, a purpose is to provide a softer material that can be highly filled with an oil and that has no bleed-out, and to provide an economical resin composition that is suitable for various applications. This resin composition contains a hydrogenated block copolymer as component (A), an oil as component (B), and a polyolefin resin as component (C).

Component (A): Hydrogenated Block Copolymer Having MFR (Measured at Temperature of 230° C. with Load of 2.16 kg) of 1 g/10 Min or Less The hydrogenated block copolymer is preferably one or more products obtained by hydrogenation (a hydrogenate or a hydride) of an aromatic vinyl-conjugated diene block copolymer comprising block polymer units (X) derived from an aromatic vinyl and block polymer units (Y) derived from a conjugated diene.

The form of an aromatic vinyl-conjugated diene block copolymer having such a structure is represented, for example, by $X(YX)_n$ or $(XY)_n$ (where n is an integer equal to or greater than 1). Of these, those of the form $X(YX)_n$, and in particular, those of the form X-Y-X are preferred. Among those of the X-Y-X form, one or more types of copolymers selected from the group consisting of polystyrene-polybutadiene-polystyrene block copolymers, polystyrene-polyisoprene-polystyrene block copolymers and polystyrene-polyisoprene/butadiene-polystyrene block copolymers are preferred.

In such an aromatic vinyl-conjugated diene block copolymer, aromatic vinyl block units (X), which are hard segments, are present as cross-linking points for conjugated diene rubber block units (Y) and form pseudo cross-links (domains). These conjugated diene rubber block units (Y) that are present between the aromatic vinyl block units (X) are soft segments having rubber elasticity.

Examples of aromatic vinyls that form the block polymer units (X) include styrene, α-methyl styrene, 3-methyl styrene, p-methyl styrene, 4-propyl styrene, 4-dodecyl styrene, 4-cyclohexyl styrene, 2-ethyl-4-benzyl styrene, 4-(phenylbutyl) styrene, 1-vinylnaphthalene, 2-vinylnaphthalene and the like. Among these, styrene is preferred.

Examples of conjugated dienes that form the block copolymer units (Y) include butadiene, isoprene, pentadiene, 2,3-dimethyl butadiene and combinations thereof. Among these, one or more types of conjugated dienes selected from the group consisting of butadiene, isoprene, and combinations of butadiene and isoprene (butadiene-isoprene copolymerization) are preferred. One or more types of these conjugated dienes may be used in combination. The conjugated diene block polymer units (Y) comprising the butadiene/isoprene copolymer units may be random copolymer units, block copolymer units and tapered copolymer units of butadiene and isoprene.

In aromatic vinyl-conjugated diene block copolymers such as those mentioned above, it is preferable for the aromatic vinyl block polymer unit (X) content to be at least 5 mass % and at most 50 mass %, more preferably at least 20 mass % and at most 40 mass %. The aromatic vinyl unit content can be measured by a conventional method such as infrared spectroscopy, NMR spectroscopy or the like.

Aromatic vinyl-conjugated diene block copolymers such as those mentioned above can be produced by various methods. Examples of production methods include (1) a method of sequentially polymerizing aromatic vinyls, then conjugated dienes, using an alkyl lithium compound such as n-butyllithium as an initiator, (2) a method of polymerizing aromatic vinyls, then conjugated dienes, and coupling these polymers by means of a coupling agent, and (3) a method of sequentially polymerizing conjugated dienes, then aromatic vinyls, using a lithium compound as an initiator.

The hydrogenated block copolymer is a product obtained by hydrogenation (a hydrogenate or a hydride), by a publicly known method, of an aromatic vinyl-conjugated diene block copolymer as mentioned above, preferably having a hydrogenation rate of 90 mol % or more. This hydrogenation rate is the value when the total amount of carbon-carbon double bonds in the conjugated diene block polymer units (Y) is defined as being 100 mol %. A "hydrogenation rate of 90 mol % or more" indicates that 90 mol % or more of the carbon-carbon double bonds are hydrogenated. Examples of such hydrogenated block copolymers indude polystyrene-poly(ethylene/propylene) block (SEP) copolymers, polystyrene-poly(ethylene/propylene) block-polystyrene (SEPS) copolymers, polystyrene-poly(ethylene/butylene) block-polystyrene (SEBS) copolymers, polystyrene-poly(ethylene-ethylene/propylene) block-polystyrene (SEEPS) copolymers and the like. More specific examples include Septon (manufactured by Kuraray Co. Ltd.), Kraton (manufactured by Shell Chemicals), Kraton G (manufactured by Shell Chemicals), Tuftec (manufactured by Asahi Kasei Corp.) (all product names) and the like.

The melt flow rate (MFR (temperature 230° C., load 2.16 kg)) of component (A), the hydrogenated block copolymer, is 1 g/10 min or less, preferably less than 0.1 g/10 min. The MFR (temperature 230° C., load 2.16 kg) refers to the MFR measured at a temperature of 230° C. and with a load of 2.16 kg in accordance with the JIS K7210 standard. If the MFR is higher than this value, bleed-out easily occurs when an oil is added, and the mechanical strength can become lower. The hydrogenation rate is measured by a publicly known method such as nuclear magnetic resonance spectroscopy (NMR) or the like.

In the present embodiment, component (A), the hydrogenated block copolymer having an MFR (measured at a temperature of 230° C. and with a load of 2.16 kg) of 1 g/10 min or less, is preferably SEEPS. Hereinafter, in the present description, the "(A) hydrogenated block copolymer having an MFR (measured at a temperature of 230° C. and with a load of 2.16 kg) of 1 g/10 min or less" will sometimes be referred to simply as the "(A) hydrogenated block copolymer satisfying specific conditions". The (A) hydrogenated block copolymer satisfying specific conditions is preferably in powder or amorphous form (crumbs) for the purposes of oil absorption work prior to kneading.

Component (B): Oil

Examples of the oil which is component (B) indude, most preferably, mineral oils such as paraffinic process oils, naphthenic process oils, aromatic process oils and liquid paraffin, and silicon oil, castor oil, linseed oil, olefinic waxes, mineral waxes and the like. Among these, paraffinic and/or naphthenic process oils are preferred. Examples of process oils include the Diana Process Oil series (manufactured by Idemitsu Kosan Co., Ltd.) and JOMO Process P (manufactured by Japan Energy Corporation). Additionally, it is possible to also use various types of ester-based plasticizers, such as those that are phthalic acid-based, trimellitic acid-based, pyromellitic acid-based, adipic acid-based or citric acid-based. These may be used singly or as multiple types. The oil which is component (B) is used in order to produce a resin composition that is softer or to better adjust the softness. Furthermore, it is used, for example, to soften the resin composition so as to produce a biological model having softness and physical properties dose to those of actual organs. It is possible to use a combination of one or more types of the above-mentioned oils. For the purposes of making the work easier, it is preferable to have the oil that is to be component (B) be pre-absorbed in the (A) hydrogenated block copolymer satisfying specific conditions. For this reason, the form of the (A) hydrogenated block copolymer satisfying specific conditions is preferably that of a powder or an amorphous form (crumbs), which makes it easier for the oil to be absorbed.

The amount of the oil which is component (B) that is used should be more than 1000 parts by mass and at most 2000 parts by mass, more preferably at most 1600 parts by mass, and even more preferably at most 1400 parts by mass relative to 100 parts by mass of the (A) hydrogenated block copolymer satisfying specific conditions. The amount of the oil that is used is adjusted, within the above-mentioned range, depending on the parts of organs or the lesions actually serving as the model. If the amount of the oil which is component (B) that is used is 1000 parts by mass or less relative to 100 parts by mass of the (A) hydrogenated block copolymer satisfying specific conditions, then the softness may be insufficient, and if the amount exceeds 2000 parts by mass, then the oil cannot be absorbed, so compounding becomes impossible. By using at most 1600 parts by mass of the oil, it is possible to better suppress the bleed-out of oil over time after molding.

Component (C): Polyolefin Resin Having Specific Surface Area in Range from 0.1 to 30 m²/g Component (C), a polyolefin resin having a specific surface area in the range from 0.1 to 30 m²/g, is effective for suppressing bleed-out when filling an oil. It can be further used to adjust the elongation and stress of the resin composition. While the specific surface area of the polyolefin resin is in the range from 0.01 to 30 m²/g, the above-mentioned specific surface area is measured in accordance with the JIS Z8830:2013 standard. If the specific surface area is smaller than the above-mentioned range, there is a risk that severe oil bleed-out will occur in the resulting resin composition having composition ranges as in the present embodiment. A polyolefin resin having a specific surface area larger than the above-mentioned range is difficult to produce industrially. Hereinafter, in the present description, "component (C), the polyolefin resin having a specific surface area in the range from 0.1 to 30 m²/g" will sometimes be referred to simply as the "(C) polyolefin resin satisfying specific conditions". Examples of polyolefin resins include polyethylene resins and polypropylene resins. The polyolefin resin may be one or more types selected therefrom. Preferably, a polyethylene resin is used, and as a polyethylene resin, polyethylene fibers are most preferably used. Examples of polyethylene resins include any one of high-density polyethylene (HDPE), low-density polyethylene (LDPE) and linear low-density polyethylene (LLDPE), and one or more types selected therefrom may be used in combination. The density of the polyethylene resin is preferably within the range from 0.88 to 0.97 g/cm³, and the MFR may be of any value, but should preferably be within the range from 0.01 to 150 g/10 min at 190° C. with a load of 2.16 kg. The MFR measurement method is as mentioned above.

The amount of the (C) polyolefin resin satisfying specific conditions that is contained should be at least 10 parts by mass and at most 120 parts by mass, preferably at most 80 parts by mass, relative to 100 parts by mass of the (A) hydrogenated block copolymer satisfying specific conditions.

The polyolefin resin may be of an arbitrary shape and may be in fiber form or in powder form. The polyolefin fibers or powder may be suitably cross-linked in advance by means of an electron beam or the like. In the present description, fiber ["sen-i" in Japanese] and fiber ["faibaa" in Japanese] have the same meaning. The concept of a fiber, in the present case, includes coiled shapes and other arbitrary shapes. In the case of a fiber, the diameter should preferably be 0.1 to 30 μm, and the length should preferably be 1 μm to 20 mm, particularly 100 μm to 10 mm. The ratio of the length to the diameter should be at least 5 or higher. In the case of a powder, the average diameter thereof should preferably be in the range from 0.1 μm to 30 μm. Polyolefin resins, particularly polyethylene fibers, are available, for example, as Kemibesto, manufactured by Mitsui Chemicals, Inc.

Surprisingly, the seepage (bleed-out) of oil is suppressed by the inclusion of the (C) polyolefin resin satisfying specific conditions. For this reason, by including the (C) polyolefin resin satisfying specific conditions, it is possible to include the above-mentioned large amount of the oil which is component (B), while suppressing bleed-out. If the (C) polyolefin resin satisfying specific conditions is not included under conditions in which the above-mentioned large amount of the oil which is component (B) is included, then there will be severe bleed-out from the resulting resin composition, making it unsuitable for practical use.

This resin composition comprising component (A) which is a hydrogenated block copolymer satisfying specific conditions, component (B) which is an oil, and component (C) which is a polyolefin resin satisfying specific conditions, has almost no bleed-out and is extremely soft, and is thus useful as a basic composition for a soft resin having various physical properties. By using this composition as the base and further, by adding other resins, fillers, fibers and the like, it is possible to appropriately change the tensile strength, the tensile elongation and the like so as to obtain the target physical properties, while preventing excessive increases in the hardness and thus providing adequate softness.

The resin composition comprising component (A) which is a hydrogenated block copolymer satisfying specific conditions, component (B) which is an oil, and component (C) which is a polyolefin resin satisfying specific conditions, has no oil seepage (bleed-out), and can be favorably used as a soft elastomer for various applications. For example, it can be favorably used as a grip material for writing implements, sporting goods, machine tools and automotive interiors, as a cable coating material, as packing, as a damping material or in sundry goods. Additionally, it can be favorably used as a skin material for robots or as a biological model member for medical use, namely, as an organ model member, an organ model member for practicing medical surgical techniques, a blood vessel model member or a skin model member.

Component (D): Inorganic Filler

The resin composition may contain an inorganic filler as component (D). By containing component (D), an inorganic filler, the texture of the resin composition can be improved, and the elongation, stress and oil absorption properties can be adjusted. Examples of the inorganic filler which is component (D) include calcium carbonate, talc, clay, calcium silicate, magnesium carbonate, magnesium hydroxide, mica, barium sulfate, titanium oxide, aluminum hydroxide, silica, alumina, carbon black and the like. Among these, it is preferable to include at least one substance selected from the group consisting of calcium carbonate, silica, alumina, talc and day, and it is more preferable to include calcium carbonate.

The specific surface area of the calcium carbonate is preferably within the range from at least 0.05 m²/g to 50 m²/g in view of the dispersion properties. In general, when a normal resin is filled with an inorganic filler, the hardness rises and the mechanical properties are lowered. However, even if calcium carbonate is blended into the resin composition of the present embodiment, hardness increases can be suppressed, and the 50% modulus and breaking strength can be increased so as to become closer to the mechanical properties of organs. Additionally, by adding calcium carbonate, it is possible to obtain a texture similar to that of organs. A texture similar to that of organs as mentioned here can be expressed in terms of the maximum static frictional force or the static friction coefficient.

The amount of the inorganic filler which is component (D) that is used is preferably at least 1 part by mass and at most 400 parts by mass relative to 100 parts by mass of the (A) hydrogenated block copolymer satisfying specific conditions. When blending calcium carbonate as the inorganic filler which is component (D), the amount should preferably be 1 to 200 parts by mass, more preferably 10 to 150 parts by mass relative to 100 parts by mass of the (A) hydrogenated block copolymer satisfying specific conditions. By setting the calcium carbonate content to be at most 200 parts by mass, the bleed-out can be better suppressed no matter what the oil blending composition is within the abovementioned range.

Component (E): Immiscible Fibrous Filler

The resin composition may contain an immiscible fibrous filler as component (E). The "component (E), an immiscible fibrous filler" refers to a filler that is not miscible with respect to the main components in the resin composition that comprises component (A) which is a hydrogenated block copolymer satisfying specific conditions, and component (B) which is an oil. By including component (E), an immiscible fibrous filler, it is possible to adjust the mechanical properties, particularly the stress properties of the resin composition. Specifically, without excessively raising the hardness, the breaking strength can be increased, the thread tearing strength can be improved and the tensile elongation can be reduced, thereby further approaching the mechanical properties of organs.

Examples of component (E) which is an immiscible fibrous filler include organic or inorganic fibers containing hetero atoms other than hydrocarbons, e.g., oxygen or nitrogen, within the molecular structures thereof. Examples of inorganic fibers include nylon fibers, polyvinyl alcohol fibers, cellulose fibers, carbon fibers, carbon nanofibers, metal fibers and the like. A polyvinyl alcohol fiber filler is preferably used as component (E), the immiscible fibrous filler. The concept of the (E) immiscible fibrous filler does not include the aforementioned (C) polyolefin resin satisfying specific conditions.

The amount of component (E), the immiscible fibrous filler, that is contained is preferably 10 to 80 parts by mass relative to 100 parts by mass of the (A) hydrogenated block copolymer satisfying specific conditions. By setting the amount within this range, the above-mentioned effects on the mechanical properties can be sufficiently obtained and it is possible to reduce the stress and to prevent the moldability from being adversely affected.

When an (E) immiscible fibrous filler is used, it is preferable to make the molding temperature lower than the glass transition temperature, the crystal melting point or the decomposition temperature thereof. If the molding temperature becomes higher than the glass transition temperature or the crystal melting point, the organic fibrous filler may be cross-linked by means of an electron beam or the like beforehand.

In the present description, fiber ["sen-i" in Japanese] and fiber ["faibaa" in Japanese] have the same meaning. The concept of a "fibrous filler" includes coiled shapes and other arbitrary shapes. The diameter of the fibrous filler should preferably be 0.001 to 50 μm, and the length should preferably be 10 μm to 1 mm, particularly 1 μm to 100 μm. The ratio of the length to the diameter should be at least 5 or higher.

The resin composition comprising component (A) which is a hydrogenated block copolymer satisfying specific conditions, component (B) which is an oil, and component (C) which is a polyolefin resin satisfying specific conditions, into which component (D) which is an inorganic filler and/or component (E) which is an immiscible fibrous filler have/has been blended as needed, like the resin composition comprising component (A) which is a hydrogenated block copolymer satisfying specific conditions, component (B) which is an oil, and component (C) which is a polyolefin resin satisfying specific conditions, can be favorably used as a soft elastomer for various applications. For example, it can be favorably used as a grip material for writing implements, sporting goods, machine tools and automotive interiors, as a cable coating material, as packing, as a damping material or in sundry goods. Additionally, it can be favorably used as a skin material for robots, and is particularly suited to use as a biological model for medical use or as a biological model member for practicing medical surgical techniques.

In the above-mentioned resin composition according to the present embodiment, it is possible to blend and use, as needed, the above-mentioned and other resins, elastomers, rubbers, plasticizers, fillers and stabilizers, anti-ageing agents, light resistance improvers, ultraviolet absorption agents, softeners, lubricants, processing aids, colorants, antistatic agents, anti-clouding agents, blocking prevention agents, crystal nucleating agents, foaming agents and the like. In order to produce the resin composition, an appropriate publicly known blending method may be used. For example, it may be melt-kneaded with a single-screw or twin-screw extruder, a Banbury mixer, a Plastomill, a Co-Kneader, a heating roll or the like. Before melt-kneading, the raw materials may be mixed uniformly by a Henschel mixer, a ribbon blender, a super mixer, a tumbler or the like. The melt-kneading temperature is not particularly limited, but should generally be 100 to 300° C., preferably 150 to 250° C.

(Resin Composition)

The above resin composition comprising component (A) which is a hydrogenated block copolymer satisfying specific conditions, component (B) which is an oil, and component (C) which is a polyolefin resin satisfying specific conditions, preferably has a type E hardness of 1 to 50. The type E hardness may also be set to be within the range from 1 to 20, or within the range from 1 to 5. The tensile elasticity of the present resin composition is preferably 0.02 to 0.6 MPa, and may be 0.02 to 0.5 MPa. The 50% modulus (stress at 50% elongation in a tensile test) of the resin composition of the present invention is preferably 0.005 to 0.3 MPa, and may be 0.005 to 0.1 MPa, or 0.01 to 0.1 MPa. The breaking elongation is preferably at least 100% and at most 500%, and the breaking strength is preferably at least 0.01 MPa.

(Resin Composition for Use in Biological Models)

The resin composition for use in biological models will be described. The resin composition of the present embodiment should preferably have, in addition to the above-mentioned softness and mechanical properties, physical properties dose to those of biological organs, skin or blood vessels. When using the resin composition in a biological model, it is possible to use an additive such as, for example, a colorant such as a pigment or a dye, a perfume, an antioxidant, an antibacterial agent or the like, within a range not impeding the purpose. In order to make the biological model more closely resemble a biological organ, blood vessels, skin, it should preferably be colored, by means of a colorant, to a color that is similar thereto.

The above-mentioned resin composition does not undergo seepage (bleed-out) of oil or additives, is easily molded, is soft, having a texture that is dose to that of biological organs, blood vessels or skin, and has practical levels of mechanical strength and tear resistance. Thus, it is suitable for use as a thermoplastic resin composition in a biological model. The thermoplastic resin composition having the present components, which has been explained above, preferably has, for example, the softness and the mechanical properties indicated below in order to have levels of softness and mechanical properties that are dose to those of biological organs, blood vessels or skin.

The type E hardness of the resin composition should preferably be 3 to 50 when it is to be used in a biological model. The tensile elasticity of the resin composition should preferably be 0.05 to 1 MPa. The 50% modulus (stress at 50% elongation in a tensile test) of the resin composition is preferably 0.01 to 0.5 MPa, more preferably 0.03 to 0.3 MPa. In particular, organ tissue is soft but has low elongation, so the breaking elongation should preferably be at least 30% and at most 300%, most preferably at least 30% and at most 200%, and the breaking strength should preferably be at least 0.1 MPa. The thread tearing strength, which is a measure of the durability of the resin composition for use in biological models, is preferably at least 1 N, more preferably at least 1.5 N. The thread tearing elongation of the resin composition is preferably at least 10 mm.

Herebelow, the texture, which is important when using the resin composition as a biological model for medical use or as a biological model for practicing medical surgical techniques, will be discussed. In addition to the above-mentioned softness and mechanical properties, the resin composition preferably has a texture dose to that of biological organs. In this case, in order to achieve a texture close to that of biological organs, it is possible to make an assessment by referring to the opinions of physicians specializing in surgery and experts engaged in the production of biological models, but the texture should preferably be expressed quantitatively in terms of the maximum static frictional force or the static friction coefficient. When there is a load of 10 g, the maximum static frictional force should preferably be at least 80 gf and the static friction coefficient should preferably be at least 8. In this case, the static friction coefficient is indicated by maximum static frictional force/load. By satisfying these conditions, it is possible to approach the texture of biological organs, such as the sense of moistness. In order to impart such a texture, it is preferable to blend, as component (D), the inorganic filler, 10 to 150 parts by mass of calcium carbonate relative to the (A) hydrogenated block copolymer satisfying specific conditions.

A preferable blended composition that satisfies all of the preferable conditions for use in a biological model contains, relative to 100 parts by mass of component (A) which is a hydrogenated block copolymer satisfying specific conditions, more than 1000 parts by mass and at most 1600 parts by mass of component (B) which is an oil, at least 10 parts by mass and at most 80 parts by mass of component (C) which is a polyolefin resin satisfying specific conditions, and as an inorganic filler which is component (D), at least 10 parts by mass and at most 150 parts by mass of calcium carbonate.

By further satisfying the conditions indicated below, it is possible to obtain the characteristics of being soft yet having low tensile elongation, and having a high thread tearing strength, specifically satisfying the condition that the tensile elongation is at most 200%, which is the most preferable for biological models. It is particularly preferable for the (E) immiscible fibrous filler, which is component (E), to contain a polyvinyl alcohol fibrous filler within the range from at least 10 parts by mass to at most 80 parts by mass.

As the molding method for the resin composition for the applications described above, it is possible to use various publicly known molding methods such as cast molding, vacuum molding, injection molding, blow molding, extrusion molding or the like. Additionally, for the purpose of improving the mechanical properties and improving the heat resistance of the resin composition, it is possible to add a cross-linking agent during melt-kneading and to perform a dynamic cross-linking process (dynamic vulcanization process) by means of a publicly known method for dynamically cross-linking normal resin compositions. Additionally, it is possible to foam the resin composition by means of a publicly known method. Foaming is particularly useful for obtaining an extremely soft material.

With the resin composition according to the present embodiment, it is possible to provide an unprecedented highly oil-filled resin composition, thereby allowing various physical properties to be designed and reproduced in accordance with the application. In particular, it is possible to provide an unprecedentedly softer resin composition lacking bleed-out. Additionally, it is possible to provide a resin composition that has a softness and a texture closer to those of biological organs, skin and blood vessels, that has high mechanical strength, that has excellent durability, and that is easy to handle.

[Biological Model]

The biological model according to the present embodiment is an application of the above-mentioned resin composition to a biological model for medical use or for practicing medical surgical techniques, and is obtained by using the above-mentioned resin composition. Examples of biological models include organ models, skin models and blood vessel models.

(Organ model)

The organ model uses the above-mentioned resin composition, and thus has elasticity (softness) similar to that of human internal organs, has low elongation, has a cutting sensation and a texture similar to those of human internal organs, and can be favorably used to practice surgical techniques using surgical cutting tools such as surgical scalpels and to practice surgical techniques such as clipping.

Herebelow, biological models for medical use and biological models for practicing medical surgical techniques using the above-mentioned resin composition will be explained. As general organ models among biological models, heart, liver and pancreas models are preferable. Organ models of the heart, the liver or the pancreas are used in training for surgery. Organ models of the heart, the liver or the pancreas have the problem that it is difficult to maintain incision ends and sutured states during mock operations. That is, there are problems in that mechanical stress during use can result in phenomena such as end portions that have been cut by a scalpel to be further torn, or torn by tension from sutured thread. These phenomena tend to occur because conventional materials do not have sufficient thread tearing strength or elongation. The resin composition of the present embodiment exhibits sufficient thread tearing strength and elongation that are of a level equivalent to those of biological organs, particularly human organs, and is therefore favorable for use as an organ model of the heart, the liver or the pancreas. Organ models can be produced by the above-mentioned publicly known molding methods using 3D data. For example, 3D data for use in organ models can be purchased and downloaded from the following sites:

http://www.3dscanstore.com/
http://3dprint.nih.gov/
http://3-d-craft.com/press/2607
http://www.model-wave.com/

An example of a biological model for practicing medical surgical techniques is an ulcer model for practicing surgical techniques, used when physicians or medical students practice surgical techniques for endoscopic hemostasis. Specifically, this model is an ulcer model for practicing surgical techniques that is to be incorporated into or adhered to the relevant part of an upper digestive organ or lower digestive organ model for practicing hemostasis operations under an endoscope. A further example is a practice model that is used by a physician or a medical student when practicing surgical techniques relating to endoscopic dissection. Specifically, this model is a model for practicing surgical techniques that is to be incorporated into or adhered to the relevant part of an upper digestive organ or lower digestive organ model for repeatedly practicing operations for dissecting submucosal layers or mucosal lesions due to cancer or the like under an endoscope.

The resin composition of the present embodiment can be molded into a biological model by means of a publicly known molding method. For example, it is possible to use various molding methods such as extrusion molding, cast molding, injection molding, vacuum molding, blow molding or the like, in accordance with the desired organ model. While embodiments of the present invention have been explained above, these are merely provided as examples of the present invention, and various configurations other than those discussed above may be employed.

(Skin Model)

An example of a skin model for medical use is skin for a human body simulator or the like, particularly for medical interns and nurses. Examples of skin models for practicing medical surgical techniques include skin on arm models for practicing injections and drip infusions, and skin on laparoscopic surgery and head surgery simulators.

(Blood Vessel Model)

An example of a blood vessel model for medical use is blood vessels for a human body simulator or the like, particularly for medical interns and nurses. Examples of blood vessel models for practicing medical surgical techniques include blood vessels in arm models for injections and drip infusion training, and blood vessels in catheter training simulators.

With the biological model according to the present embodiment, it is possible to provide a biological model that has a softness and a texture closer to those of biological organs, skin and blood vessels, that has high mechanical strength, that has excellent durability, and that is easy to handle.

EXAMPLES

Herebelow, examples will be described to aid in understanding the present invention, but the present invention is not limited to these examples. Unless otherwise noted, the examples were implemented in an environment in which the temperature was 23±2° C. and the humidity was 50%±5%.

(1) Materials

Component (A): Hydrogenated Block Copolymer Satisfying Specific Conditions

SEEPS (Septon-J3341, manufactured by Kuraray Co., Ltd.), MFR (temperature 230° C., load 2.16 kg) 0.0 g/10 min (0.0 g/10 min means that there is no flow), styrene content 40 mass %, hydrogenation rate 90 mol % or more Comparative Component (A)

SEPS (Septon 2007, manufactured by Kuraray Co., Ltd.), MFR (temperature 230° C., load 2.16 kg) 2.4 g/10 min, styrene content 30 mass %, resin form: crumbs Component (B): Oil Paraffin oil (PW-90, manufactured by Idemitsu Kosan Co., Ltd.)

Component (C): Polyolefin Resin Satisfying Specific Conditions

Polyethylene fiber (Kemibesto FDSS-2, fiber length 0.6 mm, manufactured by Mitsui Chemicals, Inc.), specific surface area 7 $m^2/g$ Comparative Component (C)

Commercially available pellet-shaped polyethylene resin (Novatec HD, HJ590N, manufactured by Japan Polyethylene Corp.), pellets were cylindrical with a diameter of 3 mm and a length of 3 mm, specific surface area was significantly smaller than 0.01 $m^2/g$ Component (D): Inorganic Filler Calcium carbonate (NS #100, manufactured by Nitto Funka Kogyo), specific surface area 1 $m^2/g$ Component (E): Immiscible Fibrous Filler Vinylon fiber (Vinylon fiber RM 182 (fiber length 4 mm), manufactured by Kuraray Co., Ltd.)

(2) Kneading Method

Component (A), the hydrogenated block copolymer satisfying specific conditions (Septon J-3341 etc.), is supplied from the manufacturer as an amorphous powder. Several days before kneading, a prescribed amount of oil was dripped onto the hydrogenated block copolymer and allowed to be well absorbed therein. The amount of the oil that was absorbed was included in the content described in Table 1. A Brabender Plasti-Corder (PL2000, manufactured by Brabender GmbH) was used, and after all of the raw materials were loaded, a sample was produced by kneading the raw materials for six minutes at 180° C. at a rotation speed of 50 rpm.

(3) Test Piece Preparation Method

Sample sheets were produced in accordance with the method indicated below.

Samples for evaluating physical properties were formed by using sheets of various thicknesses (1.0 mm, 5.0 mm) formed by means of a hot press (180° C., period of five minutes, pressure 50 kg/cm$^2$).

(4) Type E Hardness 5.0 mm-thick sheets were stacked and the type E durometer hardness was determined under conditions in which the temperature was 23±1° C., in compliance with the plastic durometer hardness test method under the JIS K7215 standard. This hardness was an instantaneous value.

(5) Tensile Tests (Tensile Elasticity, 50% Modulus, Tensile Breaking Elongation, Tensile Breaking Strength)

In compliance with the JIS K6251 standard, a 1.0 mm-thick sheet was cut into No. 2 and No. 1/2 type test piece shapes, and using a Shimadzu AGS-100D type tensile tester, the test pieces were measured at a tension speed of 100 mm/min under conditions in which the temperature was 23±1° C. The tensile elasticity was the initial tensile elasticity.

(6) Thread Tearing Tests (Thread Tearing Strength, Thread Tearing Elongation)

A Mani eyed suture needle (surgical straight No. 4 taper point) and surgical thread (Blade Silk No. 3) were passed through a sheet having a length of 35 mm, a width of 25 mm, and a thickness of 1.0 mm, at a position lying 5 mm in the lengthwise direction and 12.5 mm in the widthwise direction, the thread was pulled at a speed of 100 mm/min, and the strength and elongation until the sheet was torn were measured.

(7) Texture (Sensory Texture Test)

The texture was observed by four people engaged in the manufacture of organ models or physicians specializing in surgery, and was evaluated on the basis of the evaluation criteria indicated below (each person gave a score from 0 to 2). A total score from the four people of 4 points or higher was defined as passing, and a score of 6 points or higher was defined as indicating an excellent texture.

[Evaluation Criteria]

2 points: Sufficiently approximates biological organs 1 point: Somewhat approximates biological organs 0 points: Does not approximate biological organs (8) Texture Evaluation A sheet having a thickness of 1.0 mm was used in the texture evaluation. Using a Tribomaster Type TL201TsT manufactured by Trinity Lab Co., Ltd. equipped with a urethane resin finger model tactile contact, measurements were made under conditions in which the temperature was 23° C. and the humidity was 50%, with a load of 10 g, at a speed of 10 mm/s, with a data reading speed of 1 ms and a measurement length of 30 mm, to measure the relationship between frictional force and time, and the maximum static frictional force and the static friction coefficient were determined.

Examples 1 to 4

Thermoplastic resin compositions were obtained by using the (A) hydrogenated block copolymer satisfying specific conditions, the (B) oil and the (C) polyolefin resin satisfying specific conditions, and kneading these components using the compositions indicated in Table 1. The physical properties of these thermoplastic resin compositions were evaluated. The amounts of the respective components that were added are indicated in parts by mass. The physical property measurement results are shown in Table 2.

Examples 5 to 7

Thermoplastic resin compositions were obtained by using the (A) hydrogenated block copolymer satisfying specific conditions, the (B) oil and the (C) polyolefin resin satisfying specific conditions, further using the (D) calcium carbonate having a specific surface area of 1 m²/g and the (E) polyvinyl alcohol (Vinylon) fiber filler (RM 182, 4 mm), and kneading these components using the compositions indicated in Table 1. The physical properties of these thermoplastic resin compositions were evaluated. The physical property measurement results are shown in Table 2.

Example 8

A thermoplastic resin composition was obtained by using the (A) hydrogenated block copolymer satisfying specific conditions, the (B) oil and the (C) polyolefin resin satisfying specific conditions, further using the (D) calcium carbonate having a specific surface area of 1 m²/g, and kneading these components using the composition indicated in Table 1. The physical properties of this thermoplastic resin composition were evaluated. The physical property measurement results are shown in Table 2.

Comparative Example 1

A thermoplastic resin composition was obtained by kneading the components with the blend indicated in Table 1, under the same conditions as Example 1, except that SEPS (Septon 2007, manufactured by Kuraray Co., Ltd.), having an MFR (temperature 230° C., load 2.16 kg) of 2.4 g/10 min, was used as the hydrogenated block copolymer. The resulting resin composition had severe bleed-out and the physical properties were not evaluated.

Comparative Example 2

A thermoplastic resin composition was obtained under the same conditions as Example 1, except that the components were kneaded without using the (C) polyolefin resin satisfying specific conditions. The resulting resin composition had severe bleed-out and the physical properties were not evaluated.

Comparative Example 3

A thermoplastic resin composition was obtained by kneading the components under the same conditions as Example 1, except that a polyethylene resin (Novatec HD, HJ590N, manufactured by Japan Polyethylene Corp.) supplied as commercially available pellets was used instead of the (C) polyolefin resin satisfying specific conditions. The resulting resin composition had severe bleed-out and the physical properties were not evaluated.

Comparative Examples 4 and 5

Thermoplastic resin compositions were obtained by kneading the components under the same conditions as Example 8 and Example 5, except that calcium carbonate or a polyvinyl alcohol fibrous filler (RM 182, 4 mm) was used instead of using the (C) polyolefin resin satisfying specific conditions. The resulting resin compositions had severe bleed-out and the physical properties were not evaluated.

Comparative Example 6

The physical property values of a post-cured urethane resin (polyurethane) used in current heart models are shown in Table 2.

Reference Examples 1 to 4

Using a fresh pig heart, which is a biological organ used for training, the above-mentioned physical properties were measured for each area shown in Table 1. In Table 1, "right cardiac muscle/perpendicular to fibers" means that the physical properties were measured in the right ventride cardiac muscle of the pig heart in the direction perpendicular to the muscle fibers. "Right cardiac muscle/parallel to fibers" means that the physical properties were measured in the right ventride cardiac muscle of the pig heart in the direction parallel to the muscle fibers. "Aorta/perpendicular" means that the physical properties were measured in the aorta of the pig heart in the direction perpendicular to the aorta. "Aorta/cross-section" means that the physical properties were measured in the aorta of the pig heart in the direction along a cross-section of the aorta. The results are shown in Table 2.

TABLE 1

|  | Component (A) Septon-J 3341 parts by mass | Comparative Component (A) Septon 2007 parts by mass | Component (B) Paraffin oil (PW90) parts by mass | Component (C) Polyethylene fiber (Kemibes to FDSS-2) parts by mass | Comparative Component (C) PE pellets (Novatec HD, HJ590N) parts by mass | Component (D) Calcium carbonate (NS #100) parts by mass | Component (E) Immiscible fibrous filler (RM 182-4 mm) parts by mass |
|---|---|---|---|---|---|---|---|
| Example 1 | 100 | — | 1050 | 40 | — | — | — |
| Example 2 | 100 | — | 1050 | 20 | — | — | — |
| Example 3 | 100 | — | 1200 | 60 | — | — | — |
| Example 4 | 100 | — | 1400 | 40 | — | — | — |
| Example 5 | 100 | — | 1050 | 40 | — | 10 | 40 |
| Example 6 | 100 | — | 1050 | 40 | — | 60 | 40 |
| Example 7 | 100 | — | 1050 | 40 | — | 120 | 40 |
| Example 8 | 100 | — | 1050 | 40 | — | 120 | — |
| Comparative Example 1 | — | 100 | 1050 | 40 | — | — | — |
| Comparative Example 2 | 100 | — | 1050 | — | — | — | — |
| Comparative Example 3 | 100 | — | 1050 | — | 40 | — | — |
| Comparative Example 4 | 100 | — | 1050 | — | — | 120 | — |
| Comparative Example 5 | 100 | — | 1050 | — | — | 10 | 40 |
| Comparative Example 6 | Post-cured urethane resin (polyurethane) | | | | | | |
| Reference Example 1 | Pig heart, right cardiac muscle/perpendicular to fibers | | | | | | |
| Reference Example 2 | Pig heart, right cardiac muscle/parallel to fibers | | | | | | |
| Reference Example 3 | Pig aorta/perpendicular, inner surface measured for frictional force measurement | | | | | | |
| Reference Example 4 | Pig aorta/cross-section | | | | | | |

TABLE 2

|  | Bleed Out | Type E Hard. | Tens. Elast. MPa | 50% Mod. MPa | Tens. Break Strength MPa | Tens Break. Elong. % | Thread Tear Strength N | Thread Tear Elong. mm | Sensory Texture Test total score | Texture Evaluation Max Static Friction Force gf | Texture Evaluation Static Friction Coefficient (Ratio Max Static Friction to Load) |
|---|---|---|---|---|---|---|---|---|---|---|---|
| Example 1 | no | 2 | 0.19 | 0.01 | 0.05 | 266 | 0.9 | 20 | 3 | 38 | 3.8 |
| Example 2 | no | 2 | 0.22 | 0.01 | 0.05 | 361 | 0.8 | 35 | 4 | 42 | 4.2 |
| Example 3 | no | 3 | 0.18 | 0.02 | 0.10 | 249 | 0.5 | 45 | 2 | 30 | 3.0 |
| Example 4 | no | 2 | 0.15 | 0.02 | 0.05 | 491 | 1.2 | 33 | 2 | 28 | 2.8 |
| Example 5 | no | 38 | 0.60 | 0.29 | 0.31 | 190 | 3.0 | 13 | 8 | 116 | 11.6 |
| Example 6 | no | 27 | 0.27 | 0.11 | 0.23 | 159 | 2.3 | 20 | 8 | 97 | 9.7 |
| Example 7 | no | 25 | 0.22 | 0.11 | 0.21 | 131 | 2.0 | 18 | 8 | 114 | 11.4 |
| Example 8 | no | 5 | 0.17 | 0.08 | 0.15 | 235 | 1.8 | 17 | 8 | 136 | 13.6 |
| Comparative Example 1 | yes | physical properties could not be evaluated due to bleed-out | | | | | | | | | |
| Comparative Example 2 | yes | physical properties could not be evaluated due to bleed-out | | | | | | | | | |
| Comparative Example 3 | yes | physical properties could not be evaluated due to bleed-out | | | | | | | | | |
| Comparative Example 4 | yes | physical properties could not be evaluated due to bleed-out | | | | | | | | | |
| Comparative Example 5 | yes | physical properties could not be evaluated due to bleed-out | | | | | | | | | |
| Comparative Example 6 | — | 24 | 0.20 | 0.07 | 2.20 | 500 | 2.0 | 19 | 0 | 21 | 2.1 |
| Reference Example 1 | — | 14 | 0.17 | 0.11 | 0.12 | 47 | 3.4 | 29 | — | 122 | 12.2 |
| Reference Example 2 | — | 20 | 0.21 | 0.17 | 0.15 | 63 | 3.3 | 25 | — | 92 | 9.2 |
| Reference Example 3 | — | 25 | 0.30 | 0.20 | 1.04 | 106 | 11.0 | 33 | — | not measured | not measured |
| Reference Example 4 | — | 17 | 0.16 | 0.08 | 0.84 | 99 | 9.2 | 41 | — | not measured | not measured |

From the results in Examples 1-4, it can be understood that the resin compositions formed by containing component (A) which is a hydrogenated block copolymer satisfying specific conditions, component (B) which is an oil and component (C) which is a polyolefin resin satisfying specific conditions, in amounts within the ranges of the present invention, had no bleed-out and exhibited the prescribed softness, tensile elongation and tensile breaking strength. In contrast therewith, the resin compositions obtained in Comparative Examples 1 to 5 had severe oil bleed-out, and it was therefore clear that resin compositions with the contemplated compositions were not obtained. For this reason, no physical measurements were made.

Furthermore, Example 5, Example 6 and Example 7, in which the (D) inorganic filler or the (E) immiscible fibrous filler was included, satisfied conditions preferable for biological models in terms of the texture evaluation (static friction coefficient) in addition to the softness, the mechanical strength and low elongation.

The invention claimed is:

1. A resin composition containing:
   100 parts by mass of component (A), a hydrogenated block copolymer having an MFR (temperature 230° C., load 2.16 kg) of 1 g/10 min or less;
   more than 1000 parts by mass and at most 2000 parts by mass of component (B), an oil; and
   at least 10 parts by mass and at most 120 parts by mass of component (C), a polyolefin resin having a specific surface area of 0.01 to 30 m$^2$/g.

2. The resin composition according to claim 1, further comprising 1 to 400 parts by mass of component (D), an inorganic filler, relative to 100 parts by mass of component (A), the hydrogenated block copolymer.

3. The resin composition according to claim 2, wherein component (D), the inorganic filler, is calcium carbonate.

4. The resin composition according to any one of claims 1 to 3, further comprising 10 to 80 parts by mass of component (E), an immiscible fibrous filler, relative to 100 parts by mass of component (A), the hydrogenated block copolymer.

5. The resin composition according to claim 4, wherein component (E), the immiscible fibrous filler, is a polyvinyl alcohol fiber filler.

6. A biological model using the resin composition according to any one of claims 2 to 5.

7. The biological model according to claim 6, wherein the biological model is an organ model, a skin model or a blood vessel model.

* * * * *